United States Patent
Chen et al.

(10) Patent No.: US 9,688,927 B2
(45) Date of Patent: Jun. 27, 2017

(54) SYSTEM FOR ACCOMMODATING DIFFERENTIAL THERMAL EXPANSION IN SYNGAS COOLER

(75) Inventors: Lien-Yan Chen, Spring, TX (US); Jay Christopher Schleicher, Houston, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 658 days.

(21) Appl. No.: 13/615,386

(22) Filed: Sep. 13, 2012

(65) Prior Publication Data
US 2014/0069612 A1    Mar. 13, 2014

(51) Int. Cl.
| | |
|---|---|
| F28F 9/12 | (2006.01) |
| C10J 3/86 | (2006.01) |
| F28F 9/02 | (2006.01) |
| F28F 9/013 | (2006.01) |
| F16L 27/11 | (2006.01) |

(52) U.S. Cl.
CPC ............... *C10J 3/86* (2013.01); *F16L 27/11* (2013.01); *F28F 9/013* (2013.01); *F28F 9/0236* (2013.01); *F28F 2265/26* (2013.01); *Y02E 20/16* (2013.01); *Y02E 20/18* (2013.01)

(58) Field of Classification Search
CPC ...... F28F 9/013; F28F 9/0236; F28F 2265/26; F16L 27/11
USPC ....... 165/81, 83, 178, 82, 154; 285/226, 299
See application file for complete search history.

(56) References Cited

U.S. PATENT DOCUMENTS

| | | | | |
|---|---|---|---|---|
| 3,068,026 | A * | 12/1962 | McKamey | F16L 39/005 285/123.1 |
| 3,443,548 | A * | 5/1969 | Rich et al. | 165/81 |
| 3,850,231 | A * | 11/1974 | Creek | 165/83 |
| 3,989,100 | A * | 11/1976 | McDonald | F28F 9/0246 165/81 |
| 4,266,600 | A * | 5/1981 | Bieberbach | F28D 7/16 165/83 |
| 4,304,574 | A * | 12/1981 | Buchner et al. | 165/83 |
| 4,352,341 | A * | 10/1982 | Styslinger | C01C 1/0452 165/81 |
| 4,377,552 | A * | 3/1983 | Doublet | F28D 1/0213 165/83 |
| 4,411,308 | A * | 10/1983 | Koerdt et al. | 165/83 |
| 6,283,199 | B1 * | 9/2001 | Nakamura et al. | 165/81 |

(Continued)

FOREIGN PATENT DOCUMENTS

| | | |
|---|---|---|
| CN | 2206441 Y | 8/1995 |
| CN | 201517899 U | 6/2010 |

(Continued)

OTHER PUBLICATIONS

Unofficial English translation of Office Action and Search Report issued in connection with corresponding CN Application No. 201310418291.1 on Jul. 28, 2016.

*Primary Examiner* — Leonard R Leo
(74) *Attorney, Agent, or Firm* — Fletcher Yoder, P.C.

(57) ABSTRACT

A system includes a syngas cooler configured to cool a syngas. The syngas cooler includes a vessel with a head portion and a first opening and a first pipe that extends through the first opening. The first pipe is configured to convey a heated fluid out of the vessel. A first flanged connection is disposed about the first opening, wherein the first pipe extends through the first flanged connection and is coupled to the flanged connection.

12 Claims, 4 Drawing Sheets

(56) References Cited

U.S. PATENT DOCUMENTS

| | | | |
|---|---|---|---|
| 6,695,358 B2 * | 2/2004 | Bonn | F16L 7/02 |
| | | | 285/13 |
| 6,840,309 B2 * | 1/2005 | Wilson et al. | 165/81 |
| 7,517,373 B2 * | 4/2009 | Sakai et al. | 165/81 |
| 7,587,995 B2 | 9/2009 | Kraft et al. | |
| 8,597,384 B2 * | 12/2013 | Abbasi | F28D 7/16 |
| | | | 165/177 |
| 2009/0173484 A1 | 7/2009 | Storey et al. | |

FOREIGN PATENT DOCUMENTS

| | | | | |
|---|---|---|---|---|
| CN | 101939610 A | | 1/2011 | |
| JP | 54054357 A | * | 4/1979 | |
| JP | 60120196 A | * | 6/1985 | F28F 9/0236 |
| JP | 60185096 A | * | 9/1985 | F28F 9/0236 |

* cited by examiner

SYSTEM FOR ACCOMMODATING DIFFERENTIAL THERMAL EXPANSION IN SYNGAS COOLER

BACKGROUND OF THE INVENTION

The subject matter disclosed herein relates generally to gasification, and, in particular, to accommodating differential thermal expansion in such applications as a radiant syngas cooler (RSC), quench gasifier, convective cooler, heat exchanger, or other applications wherein internal tubes exit a pressure vessel.

In general, syngas coolers are used to cool syngas from a gasifier, which produces the syngas via a gasification reaction. As such, syngas coolers may be used in integrated gasification combined cycle (IGCC) power plants or a coal to chemical plant to cool the syngas stream from the gasifier for further processing of the syngas downstream, while producing high pressure steam which can be used throughout the plant. The syngas cooler may cool product syngas by transferring at least some of the syngas heat to a cooling fluid. Thus, to achieve syngas cooling, components within the syngas coolers may be subjected to significant thermal gradients, particularly during start-up processes. Thermal gradients may result in differential thermal expansion of components within the syngas cooler, which may cause thermal stress to components of the syngas cooler. However, to preclude potential damage to components, the syngas cooler design may incorporate advanced assembly methods and pipe routing to accommodate for thermal expansion. Unfortunately, these advanced assembly methods may hinder the ability to achieve complete non-destructive inspection of the pipe and vessel connection. Further, advanced assembly methods may be costly and time consuming.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a syngas cooler configured to cool a syngas, wherein the syngas cooler includes a vessel with a wall having a first opening and a first pipe that extends through the first opening in the wall. The first pipe is configured to convey a fluid, and the first pipe is configured undergo thermal expansion or thermal contraction along a first axis of the first pipe. A first flanged connection is disposed between the first pipe and the wall of the vessel, wherein the first flanged connection includes first and second flanged portions coupled to one another by at least one removable fastener.

In a second embodiment, a system includes a syngas cooler configured to cool a syngas, wherein the syngas cooler includes a vessel with a wall having a first opening and a first pipe that extends through the first opening in the wall. The first pipe is configured to convey a fluid, and the first pipe is configured undergo thermal expansion or thermal contraction along a first axis of the first pipe. A first expansion joint is disposed between the first pipe and the wall of the vessel, wherein the first expansion joint includes a first bellows.

In a third embodiment, a system includes a heat exchanger including a vessel with a wall having a first opening and a first pipe that extends through the first opening in the wall. The first pipe is configured to convey a fluid, and the first pipe is configured undergo thermal expansion or thermal contraction along a first axis of the first pipe. A first expansion joint is disposed between the first pipe and the wall of the vessel, wherein the first expansion joint includes a first bellows. A first flanged connection is disposed between the first pipe and the wall of the vessel, wherein the first flanged connection includes first and second flanged portions coupled to one another by at least one removable fastener.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
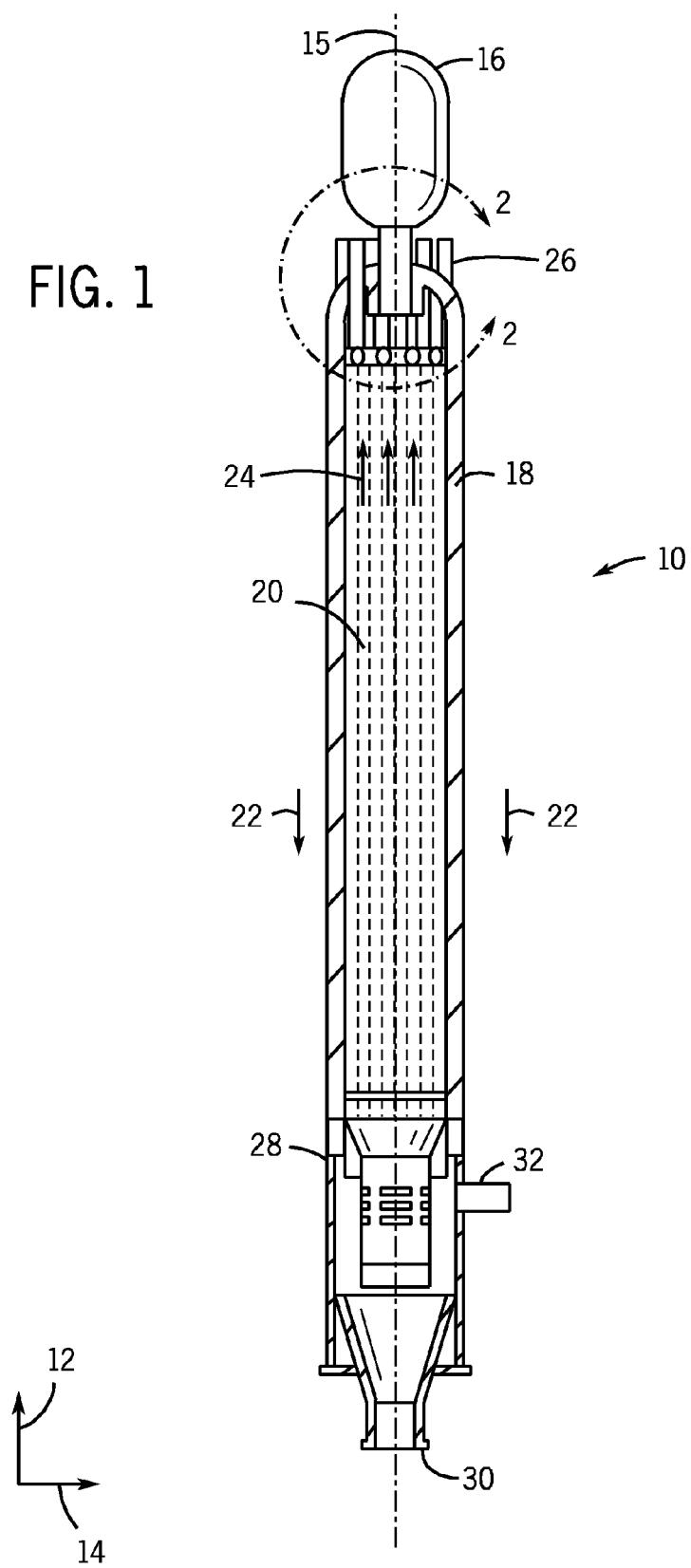
FIG. 1 is a cross-sectional side view of an embodiment of a syngas cooler (e.g., a radiant syngas cooler)

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to accommodating differential thermal expansion within heat exchangers, such as the head portion of a syngas cooler (e.g., a radiant syngas cooler or quench cooler), specifically, thermal expansion of the risers is addressed. The syngas cooler exchanges heat in an IGCC power plant or a coal to chemical plant to cool a product syngas stream from a gasifier. Accordingly, components (e.g., piping) within the syngas cooler may be subjected to large thermal gradients, which may result in differential thermal expansion of the components (e.g., risers). In rigidly fixed (e.g., welded) components, thermal expansion may cause deformation and even failure. Further, advanced assembly methods (e.g., complex welding procedures and geometries) may be employed to withstand the differential thermal expansion of the fixed components. The advanced methods and geometries may use welders with special qualifications and may inhibit a complete inspection (e.g., 100% quality control) of the resultant welds, resulting in increased expenses, material usage, and time.

In order to accommodate the differential thermal expansion, pipes exiting the head portion of the syngas cooler may incorporate an expansion joint housed within a flanged connection. The addition of the flanged connection may simplify the welding operations, thereby disposing of the need for specially qualified welders. Additionally, the flanged connection may simplify weld geometry, allowing for improved weld inspection via non-destructive testing (NDT) methods. For example, ultrasonic transmission or radiographic transmission testing may be performed on the welds associated with the flanged connections. Meanwhile, the expansion joint may accommodate the differential thermal expansion of the piping in an axial direction within the head portion of the syngas cooler with a bellows feature. Further, the expansion joint may enable increased allowable temperature differentials within the head portion of the syngas cooler. This improved operability of the combination of the flanged connection with the expansion joint may result in an overall simplified but robust design, while also reducing time and cost. Although discussed with respect to syngas coolers, the expansion joints and flanged connections may be useful in any application where internal tubes exit a pressure vessel.

FIG. 1 is a cross-sectional side view of an embodiment of a radiant syngas cooler (RSC) 10 for use in an IGCC system. The RSC 10 may employ the differential thermal expansion management assemblies (e.g., a flanged connection 50 having an expansion joint 80 with a bellows 81) further described below with respect to FIGS. 2 and 3. Various aspects of the RSC 10 may be described with reference to an axial direction or axis 12 and a radial direction or axis 14. For example, axis 12 corresponds to a longitudinal centerline or lengthwise direction, and axis 14 corresponds to a crosswise or radial direction relative to the longitudinal centerline. Further, the RSC 10 has a central axis 15, which runs parallel to the axial axis 12.

The RSC 10 receives syngas generated in a gasifier 16. The RSC 10 cools the syngas prior to transmission elsewhere within the IGCC power plant or coal to chemical plant. Cooling may begin within a vessel 18 which encloses the internal components of the RSC 10. The vessel 18 may house cooling pipes or tubing 20, which run parallel in orientation with the vessel 18, which may be oriented vertically in the case of a syngas cooler or perpendicularly in the case of a convective cooler (relative to the axial axis 12). Liquid, such as water, may flow through the pipes 20 and act as a coolant. Thus, the pipes 20 may facilitate a heat exchange process within the RSC 10 between the coolant in the pipes 20 and the syngas entering the vessel 18. The pipes 20 may circulate the coolant to an external heat exchanger to remove the captured heat. The syngas generated in the gasifier 16 may generally flow downward in the cavity of the vessel 18, parallel to the pipes 20 as indicated by arrows 22. In this manner, the syngas may contact the outside surface of the pipes 20 within the RSC 10, and the fluid flowing through the pipes 20 may remove heat from the syngas as it travels through the RSC 10. One result of this cooling process may be the generation of heated coolant in the pipes 20.

The fluid passing through cooling pipes 20 may be, for example, water. The fluid may be approximately 330° Celsius. In another embodiment, the water may range from approximately 230° C. to 355° C., 200° C. to 400° C., 260° C. to 340° C., or higher, as process industry needs dictate. In contrast, the syngas passing through the vessel 18 may range from approximately 425° and 1530° C. For example, when the RSC 10 is initialized, the syngas passing through the vessel 18 may be at a temperature of approximately 425° C. However, as the RSC 10 continues to function (e.g., after an initial start-up time), the syngas may reach up to approximately 1100° C. to 1530° C. As the heated syngas interacts with the pipes 20, it may transfer heat to both the fluid inside the pipes 20, as well as the pipes 20 themselves, thus cooling the syngas. The heated cooling fluid (e.g., water) may undergo a phase change (e.g., to steam) and travel upwards as shown by arrows 24. Upon exiting the vessel 18, the heated fluid/pipes 20 may be sufficiently hot enough to generate thermal expansion within the pipes 20. To prevent component stresses forming due to thermal expansion, the pipes 20 may incorporate an expansion joint 80 (see FIG. 3) contained within an exit assembly 26. This expansion joint 80 may enable axial adjustment of the piping 20 to compensate for the thermal expansion, while the exit assembly 26 may enable a simplified assembly process.

A lower portion 28 of the RSC 10 may separate slag (e.g., gasification waste by-product) from the syngas. The slag may exit the RSC 10 via a quench cone 30, while the cooled product syngas exits the RSC 10 via a transfer line 32. The syngas may be used as fuel in the gas turbine of the IGCC system or may be further processed to form other chemicals.

Figure 2:
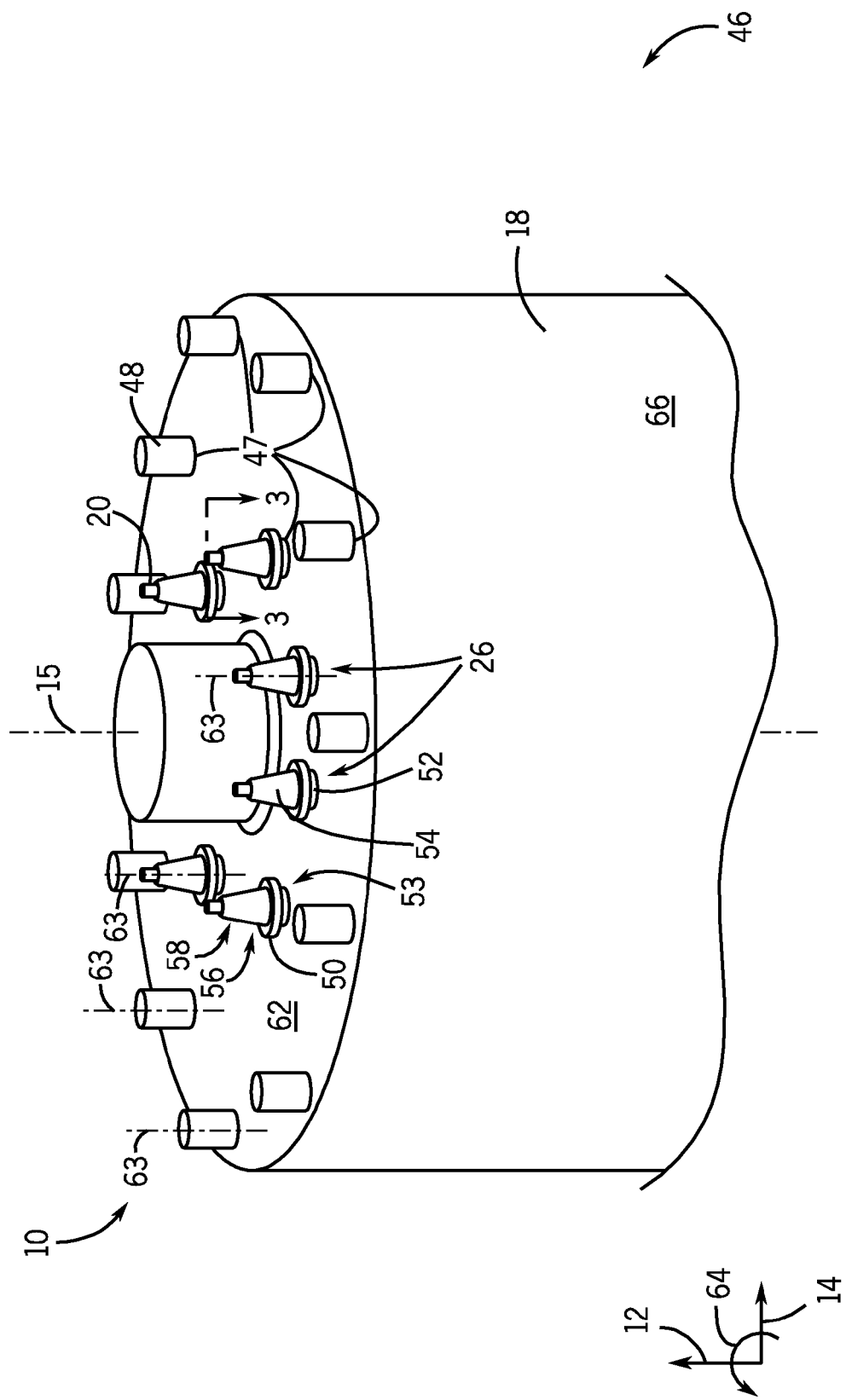
FIG. 2 is a perspective view of an embodiment of a head portion of a syngas cooler, taken within line 2-2 of FIG. 1.

FIG. 2 is a perspective view of an embodiment of a head portion 46 of the vessel 18, as taken within line 2-2 of FIG. 1. Again, the illustrated embodiment may employ one or more flanged connections 50 housing expansion joints 80 with a bellows 81 to enable thermal expansion and contraction of various tubing, e.g., through the head portion 46. As illustrated, the head portion 46 includes a cylindrical shape (e.g., a flat circular top). In other embodiments, the head portion 46 may include another shape (e.g., dome shape as illustrated in FIG. 1). The head portion 46 may contain multiple openings 47 to house downcomers 48 and the pipes 20. The downcomers 48 convey cooling fluid into the RSC 10. The pipes 20 convey the used cooling fluid (e.g., heated coolant) out of the RSC 10. The cooling fluid (e.g., liquid or gas) may be water, air, oil, or another suitable coolant fluid. For example, when water is employed as the cooling fluid, the downcomers 48 may convey water, and the pipes 20 may convey steam. The pipes 20 are exposed to ambient conditions outside the RSC 10 once the pipes 20 exit the head portion 46. Due to the large temperature difference between the fluid in the pipes 20 and ambient conditions outside the RSC 10, the pipes 20 may be subjected to a large thermal gradient. Further, the temperature of the head portion 46 may be less than the temperature of the pipes 20 containing heated coolant, thereby imposing a thermal differential. The thermal gradient may cause differential thermal expansion within the pipes 20. As discussed in detail below, the exit assembly 26 housing the expansion joint 80 may be used to mitigate the thermal expansion of the pipes 20.

The exit assembly 26 may include a flanged connection 50 (e.g., annular flanged connection) to simplify the welding procedures used to couple the pipes 20 to the head portion 46 of the RSC 10. The flanged connection 50 may include an annular first flanged portion 52 and an annular second flanged portion 54 coupled together via bolts 55 or other fasteners. In some embodiments, the flanged connection 50 may be coupled via a weld in addition to or in place of the bolts 55. Each flanged connection 50 may be disposed about an opening 47. The first flanged portion 52 may resemble a simple pipe portion with one flanged end 53 and have a uniform inner diameter greater than the outer diameter of the pipes 20. The second flanged portion 54 may resemble a nozzle, having a flanged larger end 56. The inner diameter of the flanged end 56 of the second flanged portion 54 may be greater than the outer diameter of the pipe 20. A smaller end 58 (e.g., nozzle end) of the second flanged portion 54 may have an inner diameter only slightly larger than the outer diameter of the pipes 20.

As shown in FIG. 2 (and in more detail in FIG. 3), the first flanged portion 52 may be coupled to the second flanged portion 54 at their respective flanged ends 53 and 56 via bolts 55 or other fasteners to form the flanged connection 50. The pipe portion (e.g., non-flanged end) of the first flanged portion 52 may be coupled directly (e.g., welded) to the opening 47 of the vessel 18. However, other coupling methods (e.g., fasteners, adhesive, brazing, interference fittings, etc.) may be used based on specific design intentions. The pipe 20 may extend through the vessel 18 and exit assembly 26. Upon exiting the smaller end 58 (e.g., nozzle end) of the second flanged portion 54, the pipe 20 may be coupled (e.g., welded) to the second flanged portion 54 at its smaller end 58.

FIG. 2 depicts the head end 46 of the vessel 18 with multiple downcomers 48 and exit assemblies 26. In the depicted embodiment, the downcomers 48 and exit assemblies 26 are housed in the openings 47 on a top surface 62 of the vessel 18 and arranged with their central axes 63 oriented parallel to the axial direction 12. Further, the downcomers 48 and exit assemblies 26 are concentrically arranged in rings about the central axis 15 of the RSC 10 (e.g., circumferentially 64 about the central axis 15). In the depicted embodiment, the downcomers 48 are located further from the central axis 15 of the RSC 10 in the radial direction 14 (e.g., towards the outside edge of the top surface 62) than the exit assemblies 26. However, FIG. 2 is only representative and not intended to limit the arrangement of the downcomers 48 and the exit assemblies 26. Any suitable number of downcomers 48 and exit assemblies 26 may be employed, such as approximately 2 to 40, 6 to 30, 8 to 20, or another number. Additionally, the radial 14 distance of the downcomers 48 and/or the exit assemblies 26 from the RSC 10 central axis 15 may vary along the top surface 62 of the vessel 18. Further, the downcomers 48 and/or the exit assemblies 26 may be located on a cylindrical surface 66 of the vessel 18.

Figure 3:
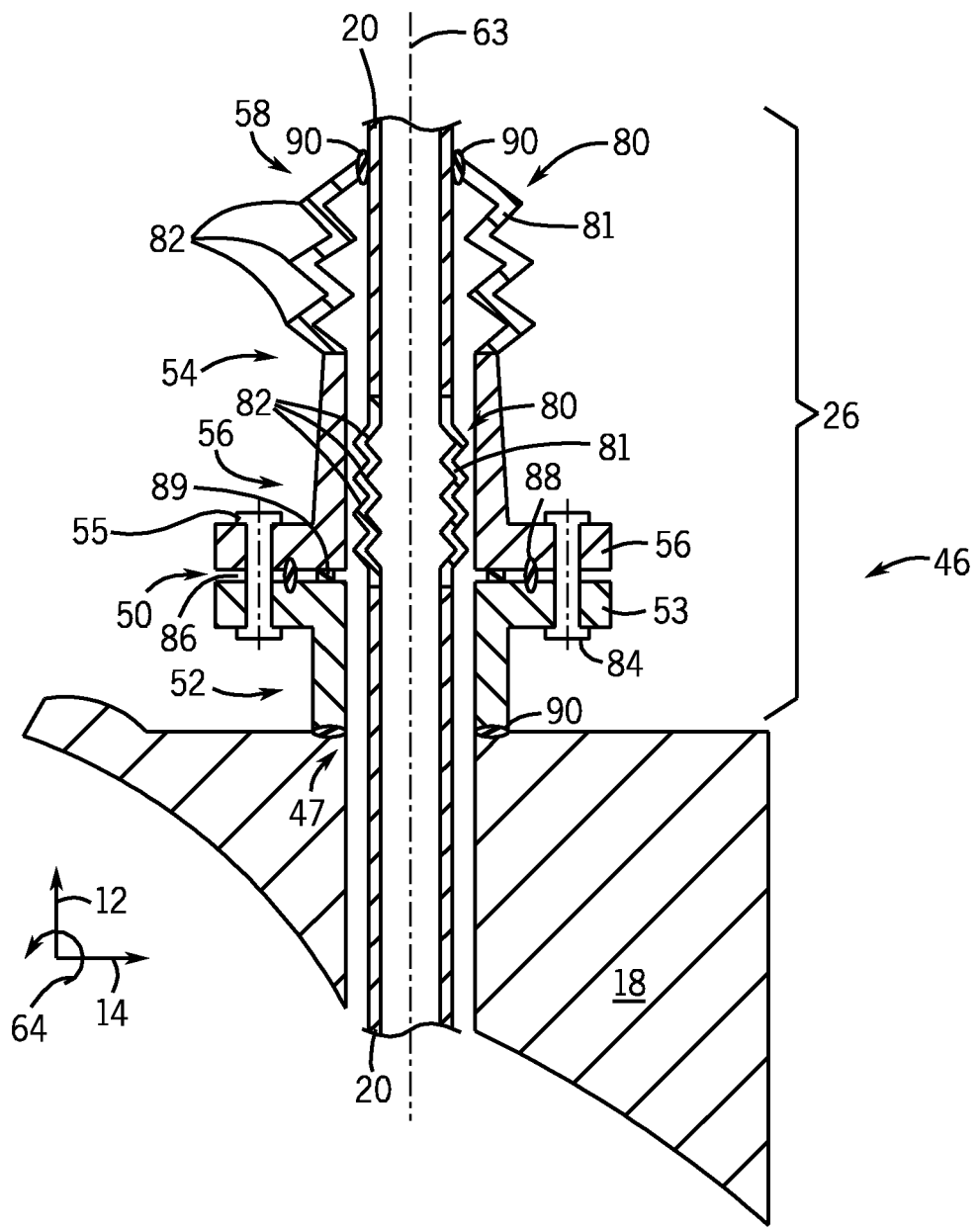
FIG. 3 is a cross-sectional view of an embodiment of an exit assembly on the head portion of a syngas cooler, taken along line 3-3 of FIG. 2.

FIG. 3 is a cross-sectional view of an embodiment of the exit assembly 26 with the pipe 20 exiting the head portion 46 of an RSC 10, taken along line 3-3 of FIG. 2. The pipe 20 includes an embodiment of the expansion joint 80, which is expandable and contractible in the axial direction 12 while retaining the heated coolant in the pipe 20. The expansion joint 80 may be constructed of the same material as the pipe 20 to enable continuous heat transfer properties. Alternatively, the expansion joint 80 may be constructed of a material with different thermal properties than the pipe 20, as determined by design goals. The expansion joint 80 may include at least one bellows 81 with one or more bends, turns, or folds 82, which extend circumferentially 64 about the axis 63 of the exit assembly 26. The bends 82 may define a zigzag, wave, or oscillating pattern of curved or angled annular sections, thereby enabling folding and unfolding in response to thermal expansion or contraction of the pipes 20. The bellows 81 may enable adjustment in the axial direction 12 of the length of the pipe 20 along its central axis 63. The illustrated bellows 81 includes four bends 82, while other embodiments may include 1 to 100 bends 82. For example, approximately 1 to 100, 5 to 50, 10 to 30, or another number of bends 82 may be used in the bellows 81. An increased number of bends 82 may allow for increased axial 12 adjustment. The axial 12 adjustment may reduce potential stresses caused by differential thermal expansion due to the temperature gradient imposed by the hot fluid conveyed within pipe 20. Further, the pipe 20 with the expansion joint 80 may accommodate a larger differential temperature than a pipe in an RSC 10 without the expansion joint 80, thereby improving cooling operability of the RSC 10.

As shown in FIG. 3, the expansion joint 80 may be contained within the exit assembly 26 such that the bottom of the expansion joint 80 aligns with the flanged connection 50. This alignment may provide simplified access and be desirable for assembly and maintenance operations. However, as determined by specific implementation criteria, the expansion joint 80 may be located at various locations along the length of the pipe 20. Further, the expansion joint 80 may also be employed on either/both of the flanged portions 52 and 54. The flanged connection 50 may contain an interface 86 formed between the flanged ends 53 and 56 of the first and second flanged portions 52 and 54. The interface 86 may contain a seal weld 88 and/or a ring joint gasket 89 to block syngas contained in the cavity of the vessel 18 from escaping the vessel 18.

As discussed, one advantage of the exit assembly 26 is the use of simplified welding procedures and geometry in order to reduce the cost and/or time of the welding processes. Further, simplified welding procedures and geometry may enable improved NDT inspection methods, increasing quality control (e.g., closer to 100%) of welds on the RSC 10. In conjunction with the flanged connection 50, two simple welds 90 may be used to secure the exit assembly 26 to the vessel 18 and pipes 20 of the RSC 10. The simple welds 90 may be used to couple the first flanged portion 52 (at the non-flanged end) to the opening 47 on the top surface 62 of the vessel 18 and to couple the smaller end 58 (e.g., nozzle end) of the second flanged portion 54 to the pipe 20. These simple welds 90 may be full penetration welds and may be created by a welder with standard qualifications, using less time than welds having complex geometries or procedures. Therefore, NDT methods, such as ultrasonic transmission and/or radiographic transmission, may be used to inspect the simple welds 90, thereby reducing the possibility of operating the RSC 10 with inadequate welds. Welds that may be 100% inspected may simplify inspection (e.g., for discontinuities/deformities) and maintenance processes, resulting in time and/or cost savings.

Figure 4:
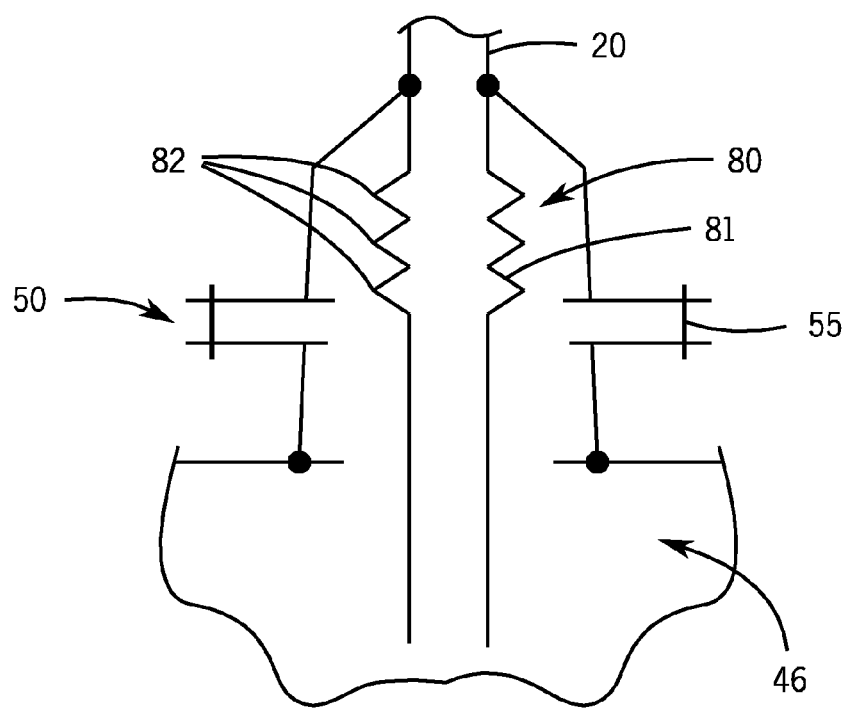
FIG. 4 is a schematic of an alternative embodiment of FIG. 3.
Figure 5:
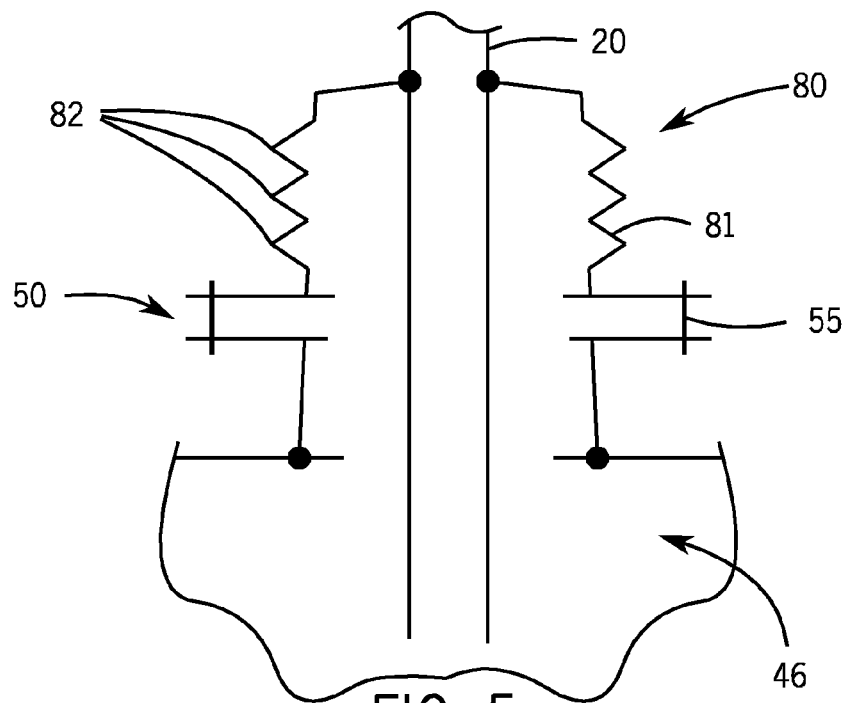
FIG. 5 is a schematic an alternative embodiment of FIGS. 3 and 4.

As previously mentioned, the expansion joint 80 having the bellows 81 may be incorporated throughout the exit assembly 26. In FIG. 3, one expansion joint 80 is employed along the pipe 20 within the flanged connection 50, and one expansion joint 80 is employed along the second flanged portion 54. This arrangement may enable increased adjustment due to thermal expansion and contraction along axis 63. However, FIGS. 4 and 5 provide alternative embodiments for the expansion joint 80 location. FIG. 4 depicts the expansion joint 80 located only along the pipe 20 within the exit assembly 26. FIG. 5 depicts the expansion joint 80 located on the outside of the exit assembly 26, as a part of the second flanged portion 54. In further embodiments, the expansion joint 80 with the bellows 81 may be located along the pipe 20, as a part of the first flanged portion 52, as a part of the second flanged portion 54, or any combination thereof.

Technical effects of the disclosed embodiments include accommodating differential thermal expansion within a syngas cooler or other vessels with exiting internal piping. Such systems may include rigidly fixed components (e.g., welded). Thermal expansion of the fixed components may cause deformation and even failure. Further, advanced assembly methods (e.g., welding) may be incorporated to endure the differential thermal expansion. The advanced welding methods and geometry may use welders with special qualifications and may prevent thorough inspection (e.g., 100% quality control) of the resultant welds. To accommodate the differential thermal expansion without the use of complex welds, piping 20 (e.g., risers) exiting the vessel 18 may incorporate an expansion joint 80 housed within a flanged connection 50. The addition of the flanged connection 50 may simplify the welding operations, thereby disposing of the need for specially qualified welders. Additionally, the flanged connection 50 may simplify the weld geometry used, allowing for the use of simple welds 90 and improved inspection (closer to 100% quality assurance) of the welds 90 via non-destructive testing (NDT) methods. The expansion joint 80 incorporated into piping 20 may accommodate the differential thermal expansion of the piping 20 along its central axis 63 in the axial direction 12. For example, the expansion joint 80 may include a resilient expansion joint, which may include a bellows 81 with one or more bends 82 that can axially expand and contract with thermal expansion and contraction of the pipe 20. Further, the expansion joint 80 may enable increased allowable temperature differences between the vessel 18 and exiting pipes 20. The combination of the flanged connection 50 with the expansion joint 80 may result in reduced time and cost of construction and/or operation of the syngas cooler or other pressure vessel system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a syngas cooler configured to cool a syngas, wherein the syngas cooler comprises:
a vessel comprising an outer wall having a first opening;
a first pipe that extends through the first opening in the outer wall, wherein the first pipe is configured to convey a fluid, and the first pipe is configured to undergo axial thermal expansion or axial thermal contraction along both a first axis of the first pipe and a longitudinal axis of the vessel;
a first flanged connection disposed outside of the outer wall and coupled to both the first pipe and the outer wall of the vessel, wherein the first flanged connection comprises first and second flanged portions coupled to one another by at least one removable fastener, the first flanged portion has a first end and a second end, the second flanged portion has a third end and a fourth end, the first end directly contacts and is coupled to the outer wall, and the second and third ends interface and are coupled to each other; and
a first bellows having a fifth end and a sixth end, the fifth end directly contacts and is coupled to the fourth end of the second flanged portion, and the sixth end directly contacts and is coupled to the first pipe at a first location outside of the outer wall, wherein the first bellows is configured to compensate for the axial thermal expansion or axial thermal contraction of the first pipe.

2. The system of claim 1, wherein the at least one removable fastener comprises a threaded fastener.

3. The system of claim 2, comprising a physical seal disposed between the first and second flanged portions.

4. The system of claim 1, wherein the first flanged connection is disposed along a head portion of the syngas cooler outside the outer wall.

5. The system of claim 1, comprising a second bellows disposed in a pipe wall of the first pipe at a second location both outside of the outer wall and within the first flanged connection, and the second bellows is configured to compensate for the axial thermal expansion or axial thermal contraction of the first pipe.

6. The system of claim 1, comprising a gasifier coupled to the syngas cooler.

7. A system, comprising:
a syngas cooler configured to cool a syngas, wherein the syngas cooler comprises:
a vessel comprising an outer wall having a first opening;
a first pipe that extends through the first opening in the outer wall, wherein the first pipe is configured to convey a fluid, and the first pipe is configured undergo axial thermal expansion or axial thermal contraction along both a first axis of the first pipe and a longitudinal axis of the vessel;
a first expansion joint coupled to the first pipe, wherein the first expansion joint comprises a first bellows configured to compensate for the axial thermal expansion or axial thermal contraction of the first pipe, wherein the first bellows is disposed in a pipe wall of the first pipe at a first location outside of the outer wall; and
a second expansion joint coupled to the first pipe, wherein the second expansion joint comprises a second bellows configured to compensate for the axial thermal expansion or axial thermal contraction of the first pipe, wherein the second expansion joint has the second bellows disposed in an intermediate wall extending between the first pipe and the outer wall of the vessel at a second location outside of the outer wall, and wherein the second expansion joint is circumferentially disposed about the first bellows at the first location.

8. The system of claim 7, wherein the intermediate wall comprises a flanged connection having first and second flanged portions coupled to one another by at least one removable fastener, and wherein a portion of the second bellows is vertically aligned with the flanged connection.

9. The system of claim 7, comprising a flanged connection disposed about the first opening at a axial location relative to the longitudinal axis outside of the outer wall and directly coupled to both the first pipe and the outer wall of the vessel, wherein the flanged connection comprises first and second flanged portions coupled to one another by at least one removable fastener.

10. The system of claim 9, wherein the at least one removable fastener comprises a threaded fastener, a welded connection, or a combination thereof.

11. The system of claim 9, comprising a physical seal disposed between the first and second flanged portions.

12. The system of claim 7, comprising a gasifier coupled to the syngas cooler.

* * * * *